United States Patent
Darden

(10) Patent No.: US 7,628,346 B1
(45) Date of Patent: Dec. 8, 2009

(54) POULTRY LITTER REJUVENATING MACHINE

(76) Inventor: John A. Darden, 1019 Lenox Brookfield Rd., Lenox, GA (US) 31637

( * ) Notice: Subject to any disclaimer, the term of this patent is extended or adjusted under 35 U.S.C. 154(b) by 153 days.

(21) Appl. No.: 11/872,905

(22) Filed: Oct. 16, 2007

Related U.S. Application Data

(60) Provisional application No. 60/892,529, filed on Mar. 1, 2007.

(51) Int. Cl.
 *B02B 7/00* (2006.01)
(52) U.S. Cl. .......................... 241/101.762; 241/101.77
(58) Field of Classification Search .......... 241/101.762, 241/101.77, 189.1, 285.1, 293; 15/93.3; 404/91
 See application file for complete search history.

(56) References Cited

U.S. PATENT DOCUMENTS

| | | | | |
|---|---|---|---|---|
| 2,015,707 | A | * | 10/1935 | Cadwell et al. ............... 404/92 |
| 2,841,946 | A | * | 7/1958 | Sutherland et al. ............ 56/289 |
| 3,452,461 | A | * | 7/1969 | Hanson ....................... 37/381 |
| 4,355,670 | A | * | 10/1982 | Ohrberg et al. ............ 144/34.1 |
| 4,619,412 | A | | 10/1986 | Willingham |
| 4,708,294 | A | | 11/1987 | Endom |
| 4,732,332 | A | * | 3/1988 | Schitemaker ................ 241/32 |
| 5,078,328 | A | * | 1/1992 | Willingham ......... 241/101.762 |
| 5,375,400 | A | | 12/1994 | Darden |

* cited by examiner

*Primary Examiner*—Faye Francis
(74) *Attorney, Agent, or Firm*—Brian D. Bellamy

(57) ABSTRACT

A poultry rejuvenating machine for attachment to a tractor includes a deck with an offset front frame attached to the top and front of the deck for attachment of the machine to a power-transfer output and a three-point hitch of a tractor. A rotating shaft is housed within the deck, and a plurality of peripheral blades are coaxially and equidistantly held on the shaft by bushings. Height adjustable skids attached to the bottom of the deck space the blades about 1 inch from the floor of a poultry house. A guide is provided on a projecting end of the deck, and a belt drive is provided on the other end of the deck that is drivingly engaged to the shaft. The machine traverses a poultry house to cut, turn and rejuvenate poultry litter.

7 Claims, 3 Drawing Sheets

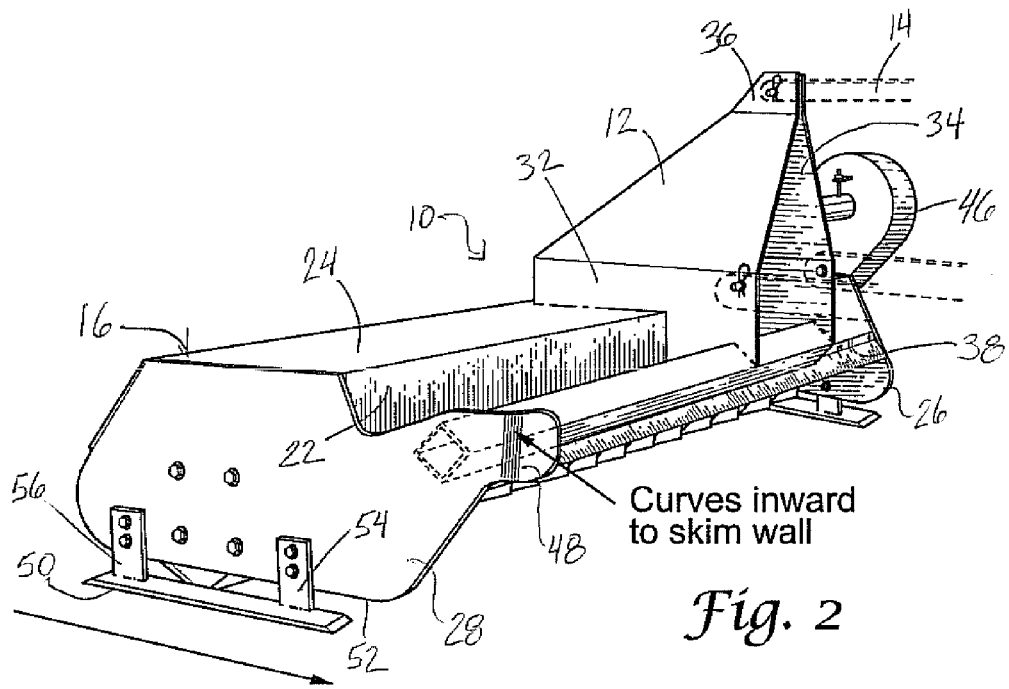
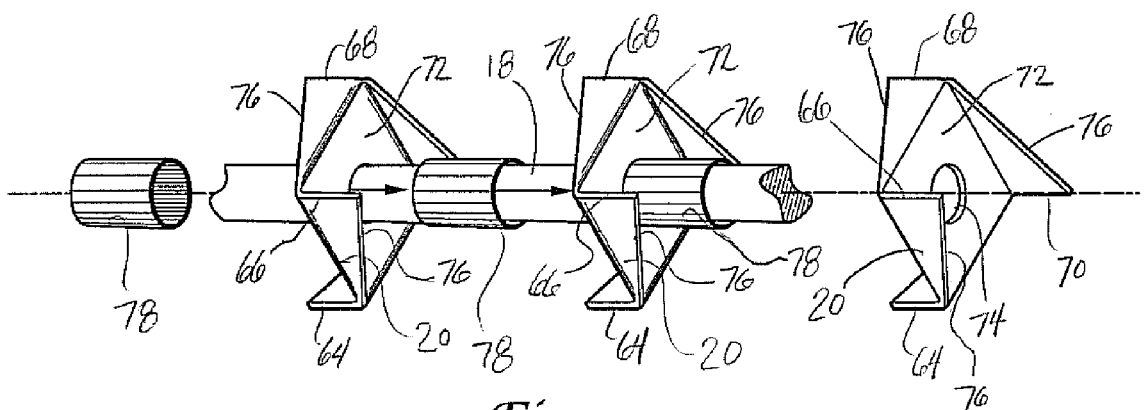

POULTRY LITTER REJUVENATING MACHINE

BACKGROUND OF THE INVENTION

1. Field of the Invention

This invention relates generally to a tractor-drawn machine for rejuvenating poultry litter accumulated over the ground surface of a poultry raising area and, in particular, to a machine for rejuvenating poultry litter that is loosened from the ground surface forward of a number of rotary peripheral cutting blades. The loosed and rejuvenated material is redeposited by the traveling machine back onto the floor of the poultry house without throwing the litter.

2. Discussion of the Prior Art

Used poultry litter contains ammonia and bacteria which are detrimental to the life of the poultry raised on it. The bacteria's byproducts can be used as a benefactor for new chicks, but the ammonia must be eliminated. Once a crop of chicks has used litter, a hard crust forms just under the surface of the litter and above the floor of the poultry house. This crust seals in ammonia that is being produced by the bird's droppings, and the ammonia cannot escape to the atmosphere. Instead without further action, the ammonia will seep out very slowly from the poultry floor and will damage the eyes and lungs of the later crop of young chicks placed on the used litter.

The benefactor element, bacteria, found in the litter can be used to improve the life of the chicks. By placing young chicks on old litter, the bacteria cause the day old chicks to build immunities to the bacteria. Whereas, if young chicks are placed on new litter, they will not acquire the immunities. Later, when the bacterium becomes present, the older chicks will not have the immunities needed in order to have a lower mortality rate.

Therefore, a need persists to destroy the crust that traps ammonia and, thereby, allow the ammonia to escape to the atmosphere and eliminate the ammonia from the litter. Litter can be rejuvenated by eliminating the crust from the poultry floor. The rejuvenated litter produces a soft area for the small chicks to bed down in, giving warmth, so the food that they consume goes to body weight and not body heat. The small amount of weight that the chick gains the first few days of life in the improved poultry house with rejuvenated litter can greatly increase profits from the production of poultry.

Poultry litter disintegrating machines now in commercial use utilizing flail units or rotors for comminuting the litter are shown, for example, in U.S. Pat. Nos. 4,619,412 and 5,078,328. In the '412 machine, a rearwardly and upwardly inclined scraper blade is positioned forward of and over the full axial length of the flail rotor. As the machine is advanced, the blade scrapes a layer of the litter from the poultry floor. The layer then moves rearwardly and upwardly along the inclined scraper blade into the operating zone of the rotor flail members, which disintegrate the litter as it moves rearwardly off the upper edge of the scraper blade. During this operation, gouging or digging of the scraper blade into the ground surface is prevented by setting the leading edge of the blade a predetermined distance above the ground surface. The cutting and lifting of the litter from the ground surface requires not only appreciable power, but care must be used in retaining the ground adjustment of the blade. In the '328 machine, ripper teeth extended forward of and mounted on the side walls of the machine act with the forward edges of the side walls to provide a section of litter for travel between the side walls. On advance of the machine, the section of litter between the side walls is acted upon by a rotary flail unit extended between and mounted on the side walls rearwardly of the ripper teeth for disintegration and discharge back to the ground floor for reuse. The density of the discharged litter material may be varied by varying its rate of discharge from the machine.

An objective of the present invention is to provide a machine of the above-described type, but which is more efficient, durable, safe to operate, and which requires little maintenance.

A further objective of the present invention is to provide a poultry rejuvenating machine that does not discharge disintegrated litter from the machine and provides rejuvenation of the litter to release ammonia while minimizing dust.

Other features and advantages of the invention will become apparent to those skilled in the art during the course of the following detailed description.

SUMMARY OF THE INVENTION

The poultry litter rejuvenation machine of the present invention is designed to increase the life of poultry house litter by breaking up the thick crust that forms just below the surface of the litter, thus allowing the ammonia to escape. The machine includes a seven-foot wide deck that saves time in rejuvenating litter by servicing the poultry house with fewer passes than comparable machines. The deck completely covers the litter impacting area, which reduces the amount of free dust and other material floating in the air. The deck of the machine is offset from the tractor to allow for close operation of the machine to a poultry house wall.

The machine uses a number of rigid peripheral blades that do not fold back under heavy loads, and these blades offer two cutting edges per revolution. The blades improve performance over comparable machines by delivering the machine's torque to the litter more efficiently. A typical configuration of the machine will include twenty-two peripheral blades situated on the shaft. The penetration of the blades with respect to the compacted litter is managed by an adjustable skid. A control on the machine adjusts the skid to control the height of the unit, and the depth of surface penetration of the blades. The peripheral loosening motion of the blades loosens the litter and causes the litter to be returned to the center of the blades by centrifugal force for additional contact and loosening by the blades.

The machine includes a belt driven rotary shaft with the blades sequentially coaxially aligned thereon. Under heavy loads, the four V-belt drive system provides for smooth operation of the machine. The belt-drive system and the deck of the machine are coupled to a tractor by fitting the machine to a three-point-hitch on a tractor, and the machine operates effectively at a standard 540 RPM via connection to a tractor power take-off (PTO).

BRIEF DESCRIPTION OF THE DRAWINGS

The invention and its advantages will be more fully described by way of example in the following description of the invention as illustrated in the accompanying drawings in which:

FIG. 2 is a front perspective view of the machine.

FIG. 3 is a fragmentary exploded perspective view of machine components.

DETAILED DESCRIPTION

Figure 1:
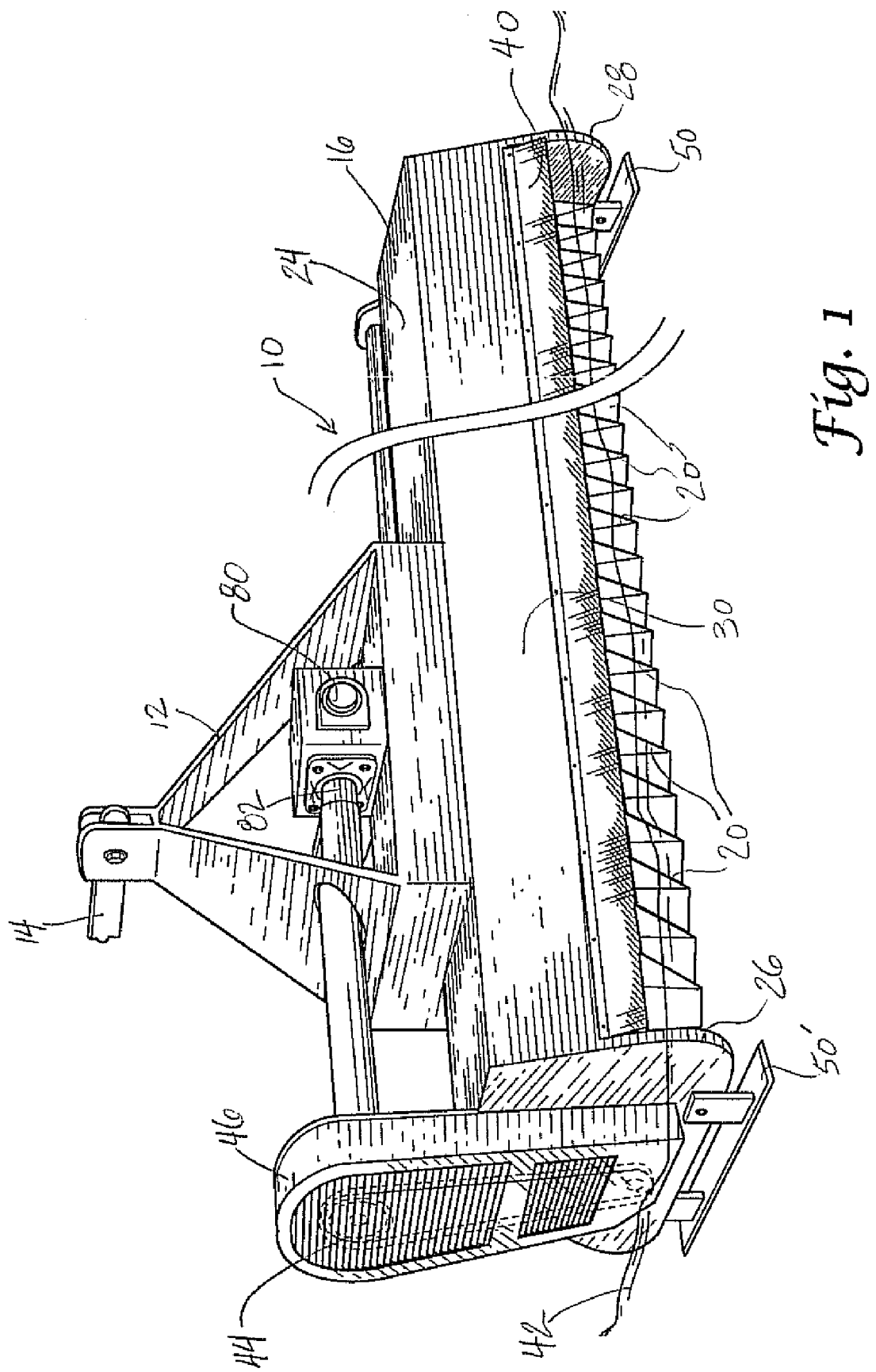
FIG. 1 is a rear perspective view of a poultry litter rejuvenating machine according to the present invention.

Referring to FIGS. 1 and 2 of the drawings, the litter rejuvenating machine of this invention, indicated generally at 10, is shown. The machine 10 projects laterally from one side of a tractor and includes an upper front frame 12 to which is rigidly secured a three-point hitch 14. The unit assembly of the machine 10 and hitch 14 is pivotally supported on a tractor for up and down movement in response to the actuation of an extensible link or hydraulic cylinder.

The machine 10 includes a deck 16, formed of a sheet metal material, covering a rotary shaft 18 and a number of peripheral blades 20. The deck 16 includes a front wall 22, a top wall 24, vertical end walls 26, 28, and a rear wall 30. The upper front frame 12 is secured to the top wall 24 and front wall 22 and includes side frame members 32, 34 and an upper bracket 36 formed at the top of the side frame members. A three-point hitch 14 can be attached to the lower portion of the side frame members 32, 34 and the upper bracket 36. The front wall 22 of the deck 16 inclines downwardly and forward and terminates upwardly from the lower ends of the end walls 26, 28. A downwardly and forward inclined first panel 38 attaches to a lower edge of the front wall 22 to form a flexible guard extending transversely along the lower edge of the front wall. The rear wall 30 of the deck 16 inclines downwardly and rearward, and terminates upwardly from the lower ends of the end walls 26, 28. A downwardly and rearward inclined second panel 40 attaches to a lower edge of the rear wall 30 to form a flexible guard extending transversely along the lower edge of the rear wall. The guard panels 38, 40 each project from the front wall 22 and rear wall 30, respectively, to reduce space between the deck 16 and the surface of litter 42 and form an enclosure for the blade work area. The forward wall and first panel define the deck such that the deck is substantially open at its forward side, particularly forward of the area comprising the blades. And, the deck is substantially open at its bottom side exposing the blades to the hardened poultry litter and poultry house floor. The bottom edges of the vertical end walls are level with the bottom side of the deck.

The upper front frame 12 is offset from the center of the deck 16 toward a belt drive system 44 situated outside of one end wall 26 and protected by a cover 46. The other end wall 28 includes a guide 48 extending forward from the end wall 28 and curving inward toward the center of the machine 10. The offset front frame 12 causes the machine 10 to project beyond the extremities of the pulling tractor on one side thereof. The projection of the machine 10 allows the machine to work up against the boundaries of the poultry area using the guide 48 as a means to gauge the position of the machine with respect to any physical boundaries present. The overall width of the deck 16 may be seven feet or more to increase the speed and productively of the machine 10 in rejuvenating litter by decreasing the number of sweeps needed by the machine to cover a poultry area.

Figure 5:
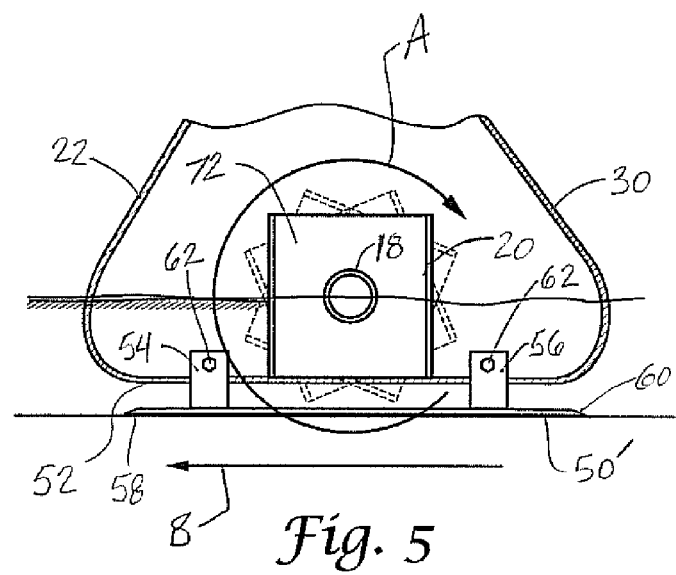
FIG. 5 is a side elevational sectional view, partially cutaway, of machine components.

Each vertical end wall 26, 28 is equipped with a skid 50 and 50' secured parallel to the bottom edge 52 of each end wall by welding the skid to the bottom edge or attaching the skid by flange members 54, 56 as shown in FIGS. 2 and 5. The skids 50, 50' are formed at their forward ends with downwardly inclined surfaces 58 and at their rearward ends with downwardly inclined surfaces 60. The inclined surfaces 58 and 60 each form an edge for smoothly engaging the litter 42 and settling the skids 50 and 50' into slidable contact with the poultry house floor or the ground in the poultry area. The skids 50, 50' support the machine 10 on the surface of the poultry house floor. The skids 50, 50' also provide for a level of the blades 20 of the machine 10 with respect to the litter 42, and provide a smooth support surface for travel of the machine. As the level of the blades 20 may need to be adjusted, the level of the skids 50, 50' may be adjustable to control the height of the deck 16 and depth of the blades 20. Therefore, the skids 50, 50' may be attached by bolts 62 through selected holes in the flange members 54, 56, wherein additional holes in the flange members are provided for changing and adjusting the height of the deck 14. The skids 50, 50' will generally situate the lower portion of the blades 20 about one inch above the floor surface in accordance with the adjustment of the height of the machine 10.

Figure 4:
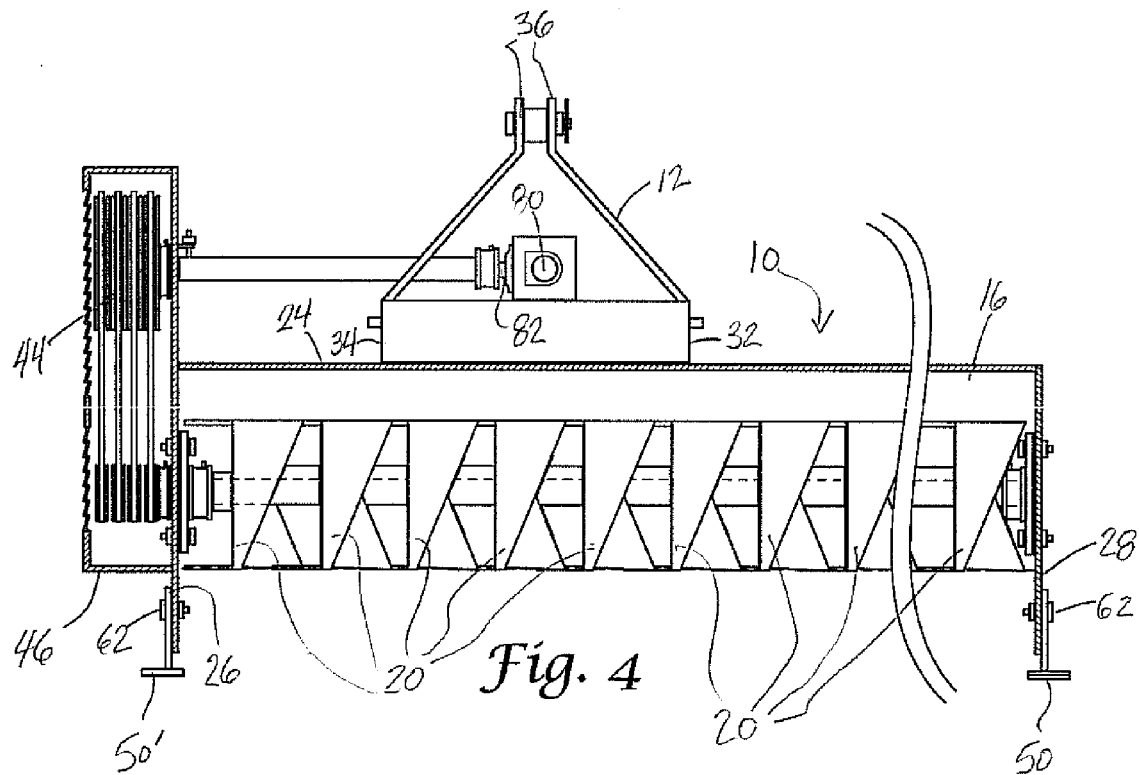
FIG. 4 is front elevational cutaway view of the machine.

Within the deck 14 and extended between the end walls 26 and 28 is a peripheral blade unit assembly that includes a transverse horizontal rotor shaft 18, the ends of which are rotatably supported in adjacent end walls. As shown in FIGS. 3 and 4, the shaft 18 carries along its length a plurality of coaxial and equidistantly spaced peripheral blades 20 having four cutting edges 64, 66, 68, and 70 (FIG. 3) radially situated on each blade. Each blade 20 is a peripheral blade that reduces back drag and requires less horsepower from the power plant. The blades 20 will not throw the litter 42 being loosened and can easily cut and move through the compacted litter. Each blade 20 has a square mounting surface 72 with an aperture 74 there through, which the shaft 18 can pass for mounting of the blade. The square mounting surface 72 has four extended radially extending members, bent 90 degrees to the square mounting surface. Two members are bent to the left and two to the right. Thus, two oppositely situated members and cutting edges extend leftward and outward a first direction from the square mounting surface and two oppositely situated members and cutting edges extend rightward and outward a second direction from the square mounting surface. The sides and that portion that is bent are parallel to the shaft that will pass though the mounting hole 74. This leaves a square that is measured diagonally for blade size which depends on the size of the blade 20 desired. The cutting edges 64, 66, 68, and 70 of FIG. 3 are along the front edge of the extended sides. The lengths of the cutting edges also depend on the desired size of the blade 20. The trailing edge of the blade 20 is angled back (ref. #76 of FIG. 3) to the square section of the blade for strength, the cutting edges are not necessarily sharpened, but are hardened for wear.

In the machine 10, the blade 20 is mounted on the shaft 18 with plurality of other blades 20 of the same type as shown in FIGS. 3 and 4. Each blade 20 is separated by a bushing 78 that allows a small amount of blade overlap, about ½ inch. The blades 20 and bushings 78 are clamped tight enough on the shaft 18 to prevent slippage unless one of the blades strike as object, which allows for safety and for survival of the equipment.

The machine 10 includes the belt drive 44 as shown in FIGS. 1 and 4. The belt drive 44 receives power input from a tractor power take-off connected through a telescopic shaft with a gear unit 80. The gear unit 80 transfers power to a shaft 82 that drives the belt drive 44, and the belt drive is drivingly engaged with the rotary blade shaft 18 coupled thereto to provide a power drive means coupled to the shaft 18 for rotation of the shaft and blades. The plurality of the blades 20 are coaxial on the blade shaft 18 and rotate with the shaft at high speed during the machine operation. The cutting edges 64, 66, 68, 70 of the rotating blades 20 turn in the direction of the arrow A in FIG. 5 or clockwise as shown in that view, while the machine 10 is moving forward in the direction of the second arrow B. The blades 20 penetrate the litter 42 toward the direction of travel. The speed of the blades 20 and the design that the blade cutting edges 64, 66, 68, 70 provide a peripheral path perpendicular to the cut and eliminate back drag, so that torque backup is not required by the power plant. Due to the design of the blade 20, when it cuts and turns the litter 42, the litter is sent to the center of the blade by centrifugal forces and then returns to the cutting edges for further cutting and fragmentation before return by centrifugal force to the poultry house floor.

Each cutting edge 64, 66, 68, 70 leads the radially extending members during clockwise rotation of the blades while the machine is moving in a forward direction. As the blades 20 rotate in a circular path and the machine 10 travels over a litter 42 section, the cutting edges 64, 66, 68, 70 will penetrate into the litter 42 on a poultry house floor, one at a time with respect to each blade, without contacting the floor surface. The blade edges will cut into the litter by individual sequential entry of each blade cutting edge into the layer of hard crusted poultry litter as the machine moves forward, thus generating loosened litter. As the cutting edges penetrate the litter, the litter is cut, turned, loosened, fragmented and returned by centrifugal force of the peripheral blades 20 to the center of the blades for further turning, cutting and loosening as the machine 10 traverses the area. The litter 42 is returned to the ground of the poultry raising area in a comminuted form for reuse or for later removal without throwing or discharging, but by centrifugal replacement of the litter back onto the ground beneath the blades 20 as the machine moves forward. The rotational speed of the shaft 18 and size of the blades 20 may be varied to adjust the speed of the blades and change the extent of cutting and breaking up of the litter 42.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A machine for rejuvenating poultry litter comprising:
    a deck that is substantially open at its forward side and bottom and having vertical end walls each with a bottom edge level with the bottom of the deck and provided between the vertical walls a top wall, a rear wall terminating at a lower edge and a front wall terminating at a lower edge above the bottom edge of the vertical walls;
    an upper front frame secured to the top wall and front wall of the deck and extending above the deck and being adapted for coupling with a tractor three point hitch;
    a skid secured to each vertical end wall adapted to slidably engage a poultry house floor, and each skid is aligned below and parallel to the bottom edge of each respective vertical end wall;
    a peripheral blade unit assembly within the deck including a transverse horizontal axis rotary shaft extending between the vertical end walls of the deck having a plurality of coaxial and equidistantly spaced peripheral blades secured along the shaft's length;
    each peripheral blade having a square mounting surface with an aperture there through, which the shaft passes for mounting of each blade, and the square mounting surface having four cutting edges for engaging hardened poultry litter radially situated on each blade extending perpendicular to the square mounting surface with two oppositely situated cutting edges extending leftward of the square mounting surface and two oppositely situated cutting edges extending rightward of the square mounting surface and with each cutting edge situated such that each cutting edge is oriented toward the forward side of the deck during rotary cutting; and
    a power drive means coupled to the shaft for receiving power input from a tractor power take-off.

2. A machine for rejuvenating poultry litter as in claim 1 comprising a downwardly and forward inclined transverse horizontal flexible first panel attached to the lower edge of the front wall and a downwardly and rearward inclined transverse horizontal flexible second panel attached to the lower edge of the rear wall.

3. A machine for rejuvenating poultry litter as in claim 1 in which each skid is removably secured and each skid being vertically adjustable with respect to the bottom edge of each respective vertical end wall whereby the level of the cutting edges with respect to the poultry house floor may be adjusted.

4. A machine for rejuvenating poultry litter as in claim 1 in which each skid is formed at its forward end with a downwardly inclined surface and formed at its rearward end with a downwardly inclined surface such that each inclined surface terminates to form a forward edge and a rearward edge of the skid respectively.

5. A machine for rejuvenating poultry litter as in claim 1 in which the plurality of coaxial and equidistantly spaced peripheral blades are arranged spirally along the shaft's length such that each cutting edge radially situated on the blades is located at a distinct point along the horizontal periphery of the peripheral blade unit assembly whereby the cutting edges may engage the hardened poultry litter sequentially one at a time.

6. A machine for rejuvenating poultry litter as in claim 1 in which each blade secured on the shaft is separated by a bushing secured on the shaft.

7. A machine for rejuvenating poultry litter as in claim 1 in which the cutting edges of each blade overlap each adjacent blade's horizontal cutting plane.

\* \* \* \* \*